United States Patent [19]

Meehleder

[11] Patent Number: 5,226,284
[45] Date of Patent: Jul. 13, 1993

[54] ENGINE-DRIVEN LAWN MOWER SYSTEM WITH A RETRACTABLE BELT-DRIVEN ROTARY GRASS TRIMMING FLAIL UNIT, AND METHODS OF MOUNTING THE UNIT ON LAWN MOWERS

[75] Inventor: John C. Meehleder, Saginaw, Mich.

[73] Assignees: Bernard C. Letherer, Zilwaukee; Daniel G. Bourdow, Saginaw, both of Mich.

[21] Appl. No.: 892,290

[22] Filed: Jun. 2, 1992

[51] Int. Cl.⁵ .................... A01D 34/66; A01D 34/76; A01D 75/00
[52] U.S. Cl. ........................... 56/11.6; 56/12.7; 56/13.7; 56/16.9; 56/17.5; 56/DIG. 9
[58] Field of Search ............... 56/11.6, 12.7, 16.9, 56/17.5, 13.7, 320.1

[56] References Cited

U.S. PATENT DOCUMENTS

| | | | |
|---|---|---|---|
| 3,236,037 | 2/1966 | Porterfield . | |
| 3,531,922 | 10/1970 | Hansen . | |
| 3,782,085 | 1/1974 | Parker et al. | 56/11.6 |
| 4,170,099 | 10/1979 | Owens | 56/16.9 |
| 4,453,372 | 6/1984 | Remer | 56/13.7 |
| 4,528,805 | 7/1985 | Zitta | 56/11.6 |
| 4,896,488 | 1/1990 | Duncan et al. | 56/13.7 |
| 4,949,536 | 8/1990 | Neufeld | 56/13.7 |
| 5,035,107 | 7/1991 | Scarborough | 56/17.5 X |
| 5,040,360 | 8/1991 | Meehleder | 56/11.6 |
| 5,048,276 | 9/1991 | Miller | 56/16.9 |
| 5,159,803 | 11/1992 | Earley, Jr. | 56/12.7 |
| 5,167,108 | 12/1992 | Bird | 56/11.6 |

FOREIGN PATENT DOCUMENTS 244666  1/1966 Austria .

Primary Examiner—Stephen J. Novosad
Attorney, Agent, or Firm—Learman & McCulloch

[57] ABSTRACT

A motorized lawn mowing machine has a generally horizontal deck with an engine releasably mounted thereon. A vertical drive shaft driven by the engine protrudes through an opening in the deck to mount a grass cutter blade thereon below the deck. A releasably mounted adaptor plate is mounted on the deck between the engine and deck, the plate having an opening for passing the shaft and having radially extending extension arm mechanism with parallel arms projecting radially at a sidewisely forward angle. The plate houses a first pulley fixed to rotate with the shaft at the level of the arms. The arm mechanism slideably supports a vertical flail assembly having an upper second pulley in alignment with the first pulley. An endless belt drive member is trained around the pulleys, and manipulatable mechanism is connected to slide the vertical flail device on the arm mechanism to engage and tauten the endless member to rotate the flail assembly.

20 Claims, 4 Drawing Sheets

ENGINE-DRIVEN LAWN MOWER SYSTEM WITH A RETRACTABLE BELT-DRIVEN ROTARY GRASS TRIMMING FLAIL UNIT, AND METHODS OF MOUNTING THE UNIT ON LAWN MOWERS

BACKGROUND OF THE INVENTION

This invention relates to lawn mower systems which include motor-driven, rotary blades and, at the same time, incorporate flailing trim cord units which extend laterally radially to the side of the lawn mower at a forwardly disposed angle so that the lawn mower can, while mowing a swath, readily trim the grass around trees and close to fixed structures such as buildings. The unit is particularly designed to be mounted on existing, walk behind, lawn mowers of either the self-propelled or push type, and is adaptable to a wide variety of lawn mowers which presently are sold in the market place, as an after market product.

Various prior art patents have sought to incorporate a flailing trim unit on various types of lawn mowers but, to my knowledge, no lawn mower manufacturer has at this time marketed a lawn mower with a trim unit in place. Among the proposed designs are those exemplified in the following patents, which I incorporate herein by reference:

| | |
|---|---|
| 3,236,037 | Porterfield |
| 3,531,922 | Hansen |
| 3,782,085 | Parker et al |
| 4,170,099 | Owens |
| 4,453,372 | Remer |
| 4,896,488 | Duncan et al |
| 4,949,536 | Neufeld |
| 244,666 | Wegenaur (Austria) |
| 5,040,360 | Meehleder |

One of the prior art mechanisms is the present inventor's system for adapting a rotary trimmer disk with flailing cords to a riding lawn mower having two or three, side by side, rotary blades driven by a centrally mounted engine, which is disclosed in U.S. Pat. No. 5,040,360. A drive pulley was mounted on one of the blade shafts and drove a rotary flail trimmer via a belt which was disengaged automatically when the flail unit was moved from a horizontal trimming position to a vertically raised inoperative position by an operator-controlled mechanism.

In U.S. Pat. No. 3,782,085 another horizontal trim unit is disclosed as mounted on what is believed to be a multi-blade riding lawn mower but the trim unit operates continuously and cannot be moved to and from an inoperative position. In this patent the flailing trim unit is disabled by removing the drive belt.

SUMMARY OF THE INVENTION

The present adaptor system has been designed to provide a readily installed flail trimming unit for motor-driven lawn mowers of either the pushed or self-propelled variety and can be directly driven from the engine drive shaft One of the prime objects of the present invention is to provide a flail mount system, adaptable to after market lawn mowers, which is installable by relatively unskilled home owners on their existing lawn mowers.

Another object of the invention is to design a system which is horizontally retractable to the minor degree necessary to disable the flail unit, and remains normally in this inoperative position.

Still another object of the invention is to design a system which operates with great safety, because the flail unit is normally disabled and is operated only when the person using the lawn mower is walking behind the lawn mower, from a control which is mounted on or adjacent to the mower handle.

Still another object of the invention is to design a system of the character described which is versatile and adaptable to the majority of lawn mowers already on the market, which have, for example, decks of differing height and configuration.

Still another object of the invention is to design a flail unit mount system which functions to mount the flail unit in position at a predesignated level while adapting to the fact that the engine is raised when the mount system is installed.

Another object of the invention is to provide an integrated unit which functions as a mount device, while, at the same time, providing belt guards and support for pulley retracting mechanism to slack the belt and disable the drive.

Still another object of the invention is to design a less complicated, economical flail unit mounting and operating system, for after market lawn mowers particularly, which need not employ costly components and is affordable by the average lawn mower owner.

Still another object of the invention is to design a system of the character described which is durable and requires little maintenance, and can be readily transferred from a lawn mower which is no longer repairable to another lawn mower which is still in service.

Other objects and advantages of the invention will become apparent with reference to the accompanying drawings and the accompanying descriptive matter.

DETAILED DESCRIPTION OF THE PREFERRED EMBODIMENT

Figure 1:
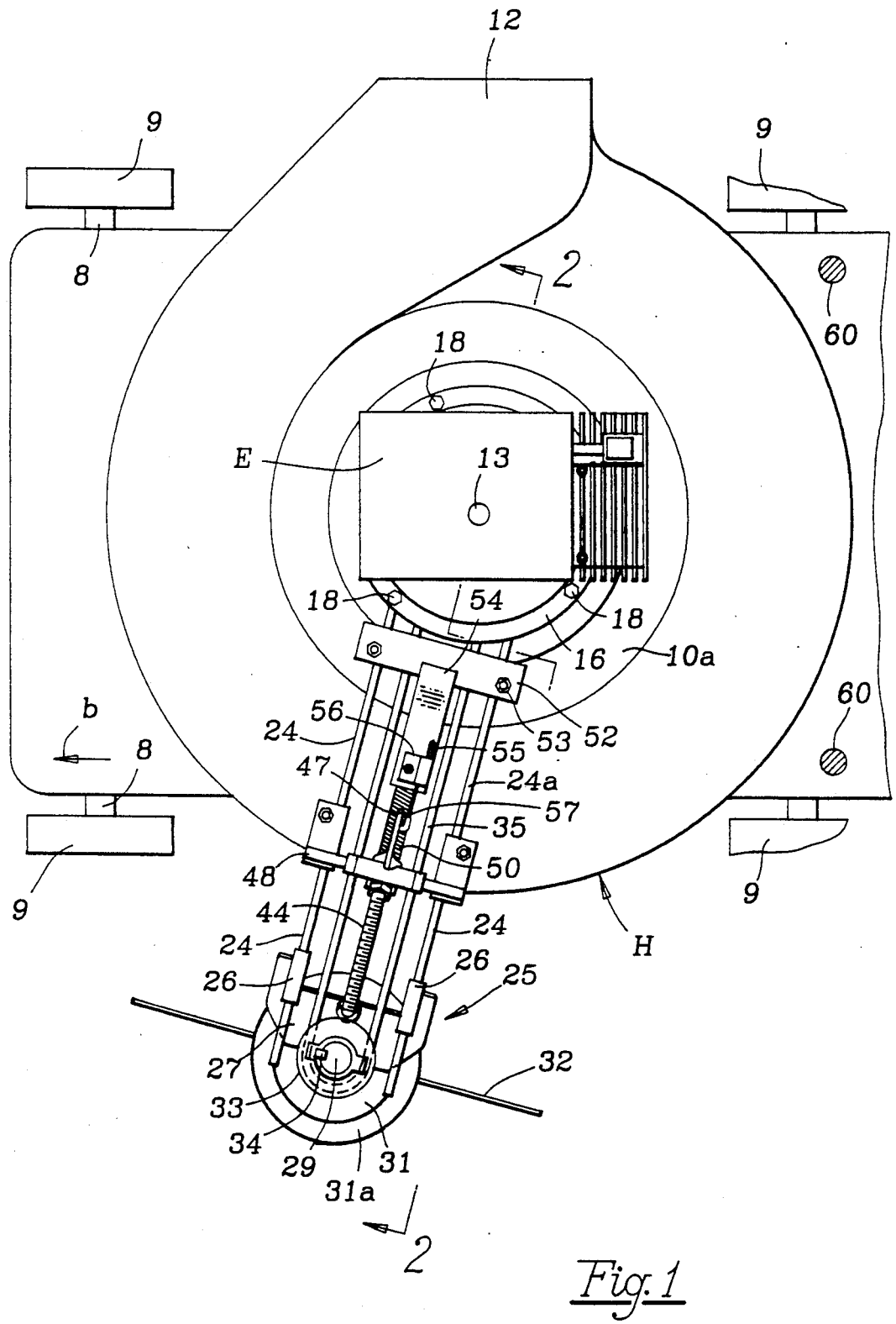
FIG. 1 is a fragmentary, top plan view showing the system mounted on a conventional lawn mower.
Figure 2:
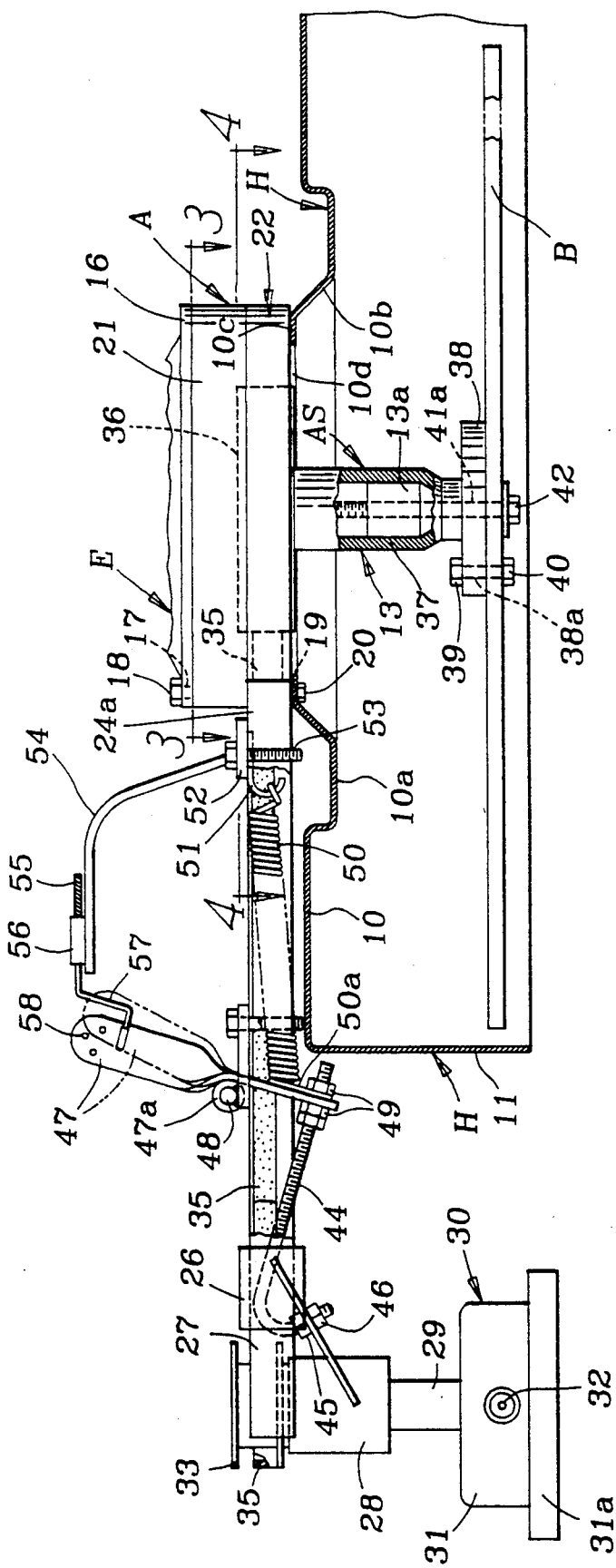
FIG. 2 is a fragmentary, transverse sectional elevational view taken on the line 2—2 of FIG. 1.

Referring now more particularly to the accompanying drawings, and in the first instance to FIGS. 1 and 2 thereof, the lawn mower, having axles 8 for wheels 9, is shown as also having a blade housing, generally designated H, which has a deck portion 10 with a dependent skirt portion 11. At one side, the skirt portion 11 is shown as including a grass discharge opening 12 in the usual manner, but, it is to be understood that the housing H shown is only typical of many of those in use and the lawn mower housing could be of a different design of the type used in mulching units where the grass is not discharged laterally.

For purposes of reenforcing the deck structure 10, the usual rigidifying recess 10a is provided in the deck along with a central annular raised rib 10b which has an inturned flange 10c surrounding an opening 10d. It is to the flange 10c that the lawn mower engine, generally designated E, normally mounts, and, typically, the drive shaft 13 of the engine E extends down through the opening 10d in the deck.

The present adaptor plate structure, generally designated A, is designed to mount above the deck, between the engine and deck, and incorporates adaptor mechanism which will be described to enable mounting of the grass cutting blade B at the height desired, without any need for lengthening the engine drive crankshaft 13. It is to be observed that the engine E, which typically is a two or four cycle, gasoline powered engine with a horsepower rating of three and one-half to five horsepower has a lateral annular flange 16. The flange 16 typically has three bores or openings 17 for receiving the bolts 18 which are of sufficient length to extend down through the aligned openings 19 provided in the deck and be secured by nuts 20.

Figure 3:
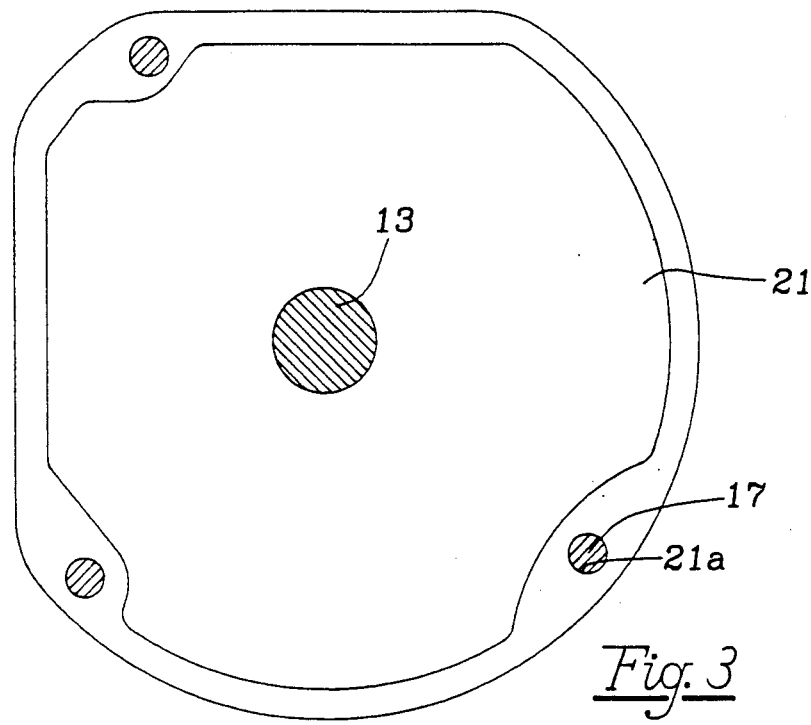
FIG. 3 is a fragmentary plan view taken on the line 3—3 of FIG. 2, but showing the spacer ring.

In the embodiment which is illustrated, I have used a spacer ring 21 (see FIG. 3) which similarly includes opening 21a, aligned for receiving the bolts 17. The spacer ring 21 mounts atop an adaptor structure plate generally designated 22 and having similar openings 22a, aligned for receiving the bolts 17. Ring 21 may be formed of a suitably rigid and strong plastic material. The adaptor plate 22 is horseshoe shaped and has a flat portion 22b provided with a central opening 23 surrounded by a U-shaped extension mechanism 24 with extending arms 24a. While the horseshoe shaped portion 22 may be formed of plastic, the mount arm mechanism 24 is formed of steel. It is to be understood that the part 24 is integrated with the part 22b in a suitable manner so that the adaptor plate 22 is compositely one piece.

Mounted on the free terminal ends of the bars 24a, is a slide mechanism, generally designated 25, which includes a pair of slide bearings 26 connected together by a web 27 to which a ball bearing housing 28 is fixed. The bearing housing 28 is adapted to receive the drive spindle 29 of a conventional rotary disk cord flail, generally designated 30, which as usual, includes a cord mounting housing 31 with a lower flange part 31a. The replaceable trimmer cords 32 extend from the housing 31 in the usual manner. It is to be understood that the unit 30 is commonly available in the market place. The unit may be of the type, for example, illustrated in U.S. Pat. No. 4,561,819.

The reduced diameter upper end of shaft 29 mounts a drive pulley 33 by means of a key 34, and it is to be understood that the drive pulley 33 is in horizontal alignment with the horseshoe shaped adaptor plate 22. Provided to drive a belt 35, which is trained around the pulley 33, is a pulley 36 which is an integrated part of an adaptor sleeve assembly, generally designated AS, which also includes a sleeve 37 and a blade 38 mounting flange. It is to be understood that the flange 38 has openings 38a for bolts 39 which extend through openings in the blade B and are secured by nuts 40. In addition, the flange 38 has a central opening 41 for the bolt 42 which extends up through the opening 41 and into the adaptor sleeve 37 to be received in a threaded opening 43 provided in the lower end of the engine crankshaft 13.

The upper end of sleeve 37 is keyed to the crankshaft 13 as at 15a. To operatively engage the pulley 33 with the slacked drive belt 35, a threaded rod 44 is connected by means of nuts 45 and 46 to the recessed lower portion of web 27. Web 27 is welded in place to unite the slide bearings 26 with the roller bearing 28. At its inner end, threaded rod 44 connects to a vertically extending lever 47 which has a bearing 47a adjacent its ends which mounts on a fixed pin 48 so as to be pivotal thereon. The rod 44 may be secured to the lower end of the lever 47 by means of nuts 49.

To the lower end of lever 47, is affixed a coil spring 50 which has an extending eye 50a connected by the outermost nut 49 to lever 47. At its opposite end, the spring 50 has an extending eye 50b which connects to a hook member 51 which is mounted on a crossbar 52, secured to bars or rails 24a, by welding, or in any other suitable manner. The crossbar 52 includes bolt members 53 which can be welded to the rails 23. It will be seen that crossbar 52 has an upwardly extending integrated support 54 for holding the cable assembly 55 which operates the flail device, the support 54 having a cable mount 56 and the cable assembly 55 having an extending cable 57 attaching to one of a series of openings 58 provided in the upper end of lever 47. With the cable 57 in normal position, the link 47 is in the position shown in which coil spring 50 is in contracted position and the belt 35 is slacked with respect to the pulley 33. The chain lines in FIG. 2 illustrate a position in which the cable 57 has pivoted the lever 47 in a clockwise direction around pin 48, and pulley 33 has been moved outwardly into driving engagement with the tautened belt 35. The lever 47 provides the leverage for easily moving the pulley 33 to driving position, and enables the operation to be performed by a cable 57 which is pulled in a direction opposite to the direction in which it is desired that the pulley 33 move.

Figure 5:
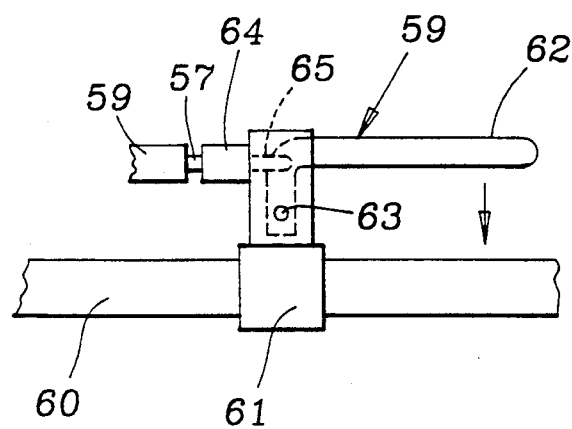
FIG. 5 is an enlarged, fragmentary plan view showing the control unit for the flail assembly mounted on the lawn mower handle.

An actuator device, generally designated 59, in FIG. 5, is mounted on the bight of the U-shaped lawn mower handle 60 and includes a clamp 61 having an inwardly extending clevis part 61, within which a pivotal bell crank actuator 62 is normally operative, on a pivot pin 63. The opposite side of the member 61 incorporates a tubular member 64 for receiving the end of cable 57 which attaches as at 65 to the actuator 62. Accordingly, with clockwise pivoting on the actuator 62 in FIG. 5, as indicated by the arrow a, cable 57 is pulled and lever 47 is pivoted to drivingly engage the belt 35 with the pulley 33 and operate the rotary trim cord device 31. When the actuator 62 is released, the spring 50 restores the pulley 33 to its normal position in which the belt 35 is slacked and does not drive pulley 33, and actuator 62 is restored to the position shown in FIG. 5. The pulley 33 is normally half the diameter of pulley 36 so that the speed of rotation of shaft 29 is twice the speed of rotation of the engine shaft and blade B. Typically, a normal speed of operation of the blade is 3,000 rpm, and the flail unit 30 should operate at twice that speed.

It is to be understood that the blade B could be of the type in which the outer perimetral cutting edge is downwardly offset.

Provided within the adaptor sleeve 37 is a spacer sleeve generally designated S which enables mounting of the blade B at the designated level, considering the fact that, in mounting the flail assembly, the engine E has been repositioned upwardly with respect to the deck 10 by the spacer ring 21 and adaptor plate 22. Depending on the lawn mower being fitted and the configuration of the engine E, spacer ring 21 may, or may not, be used.

Figure 4:
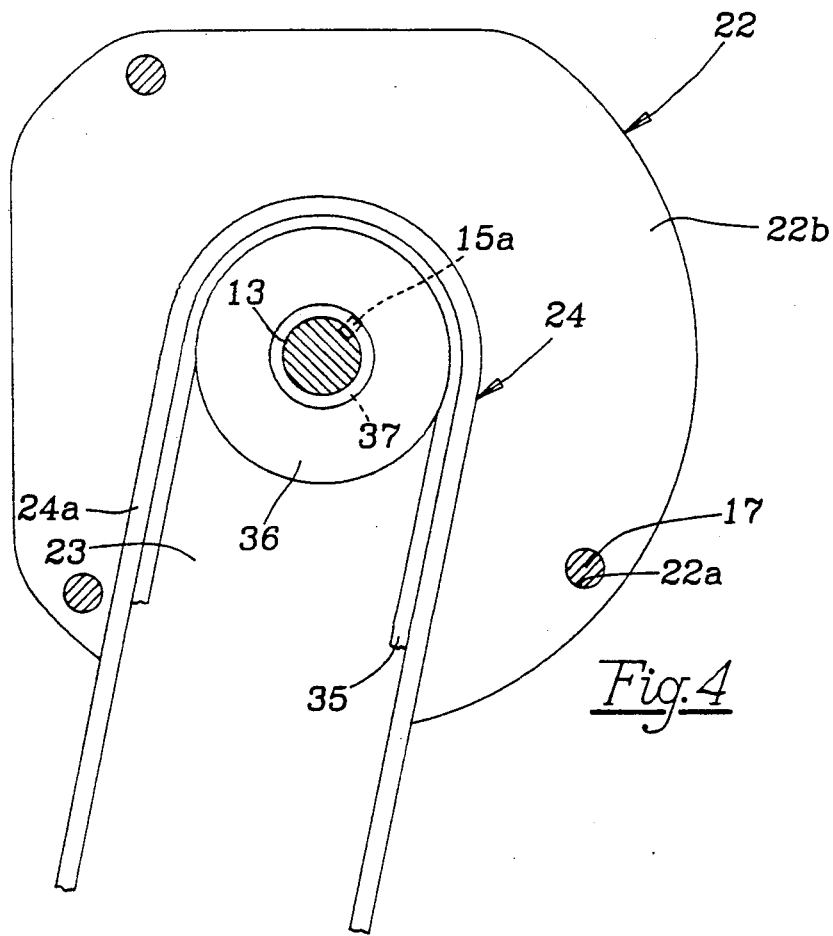
FIG. 4 is a similar fragmentary view taken on the line 4—4 to show the flail unit mount adaptor plate.

To attach the system in position on an after market lawn mower, it is only necessary to detach blade B from the engine shaft 13 and remove the bolts 18 and the engine E. Then, assuming no spacer ring 21 is necessary, the adaptor plate 22 is placed in position and the engine is placed to receive shaft 13 in the adaptor sleeve unit AS. Pulley 36 will be received within arm mechanism 24 as shown in FIG. 4. Bolt 42 can be threaded into the opening in engine shaft 13 and the blade B can be mounted to flange 38. With no spacer unit 21 in position, the pulley 36 selected may be wholly below the top of the adaptor plate 22 and fully contained within it.

THE OPERATION

The normal path of movement of the lawn mower is indicated by the arrow b in FIG. 1, and, it is to be understood, that the flail cords 32, when operable and centrifugally extended, flail at the same level as the blade B so that the swath cut is of the same height. Normally the pulley 33 is maintained in the radially inner position in which belt 35 is slacked and does not cut. However, when the lawn mower is cutting a swath adjacent to a building, for example, the operator pivots actuator 62 which operates lever 47 to move the pulley 33 to the radially outer position in which it is driven by the belt 35 and flail cords 32 operate to cut the grass adjacent to the building. When this cut has been completed, the operator releases the actuator 62 and the spring 50, which has been stretched, contracts to original position. In the normal operation of the lawn mower the use of the flail device 30 is not necessary and it remains in the inoperative position.

It is to be understood that the spacer S is only used when the spacer ring 21 is in use and is of the height thereof. The adaptor sleeve AS is of a length greater than the length of the protrudant engine shaft 13 (which comes with the lawn mower) to compensate for the height of the adaptor plate 22. While I have shown the adaptor plate 22 as directly mounted below the engine so that crankshaft 13 extends through it, it is to be understood that the adaptor mechanism could be applied to a pulley shaft on a lawn mower which has, for example, a pair of blades driven by pulleys from a centrally mounted engine.

It is to be understood that the embodiments described are exemplary of various forms of the invention only and that the invention is defined in the appended claims which contemplate various modifications within the spirit and scope of the invention.

What is claimed is:

1. In a rotary lawn mowing machine supported on front and rear wheels and having a generally horizontal deck with an engine releasably mounted thereon having a vertical drive shaft protruding through an opening in the deck to mount grass cutter blade mechanism thereon below the deck at a predetermined level to cut grass in a longitudinal path as the machine moves in a forward path of travel, the improvement wherein:
   a. a releasably mounted adaptor plate is mounted on said deck between said engine and deck, the plate being horseshoe-shaped to provide an opening for passing said shaft, and having radially outwardly extending extension arm mechanism with parallel arms projecting radially at a sidewisely forward angle;
   b. a first pulley is fixed for rotation with said shaft at the level of said arms within said opening in the plate;
   c. said arm mechanism slideably supports a vertical flail shaft assembly having a second pulley in alignment with said first pulley mounted on a vertical flail shaft;
   d. a rotary flail device having generally outwardly extending, grass trimming, flail members is fixed to said flail shaft near the lower end thereof at a level to complement the cut taken by said blade mechanism;
   e. an endless belt drive member is trained around said pulleys; and
   f. manipulatable mechanism is connected to slide said vertical flail device on said arm mechanism to engage and tauten said endless member and thereby restore the drive of said flail shaft.

2. The machine defined in claim 1 wherein a crosswise pivot is provided on said arm mechanism; a lever extends therefrom, and a connection is provided between said lever and flail device to move the latter radially inwardly on said arm mechanism to slack said endless member.

3. The machine of claim 2 in which spring mechanism connects with said lever to maintain said second pulley normally in a radially inner position which slacks said belt member.

4. The machine defined in claim 1 wherein a vertically extending adaptor sleeve mounts said first pulley and receives and houses the protrudant shaft, there being affixing mechanism for releasably connecting said sleeve to the engine shaft, and the blade to said sleeve.

5. The machine of claim 4 wherein a spacer ring is interposed between said adaptor plate and engine, and a spacer sleeve is mounted within said adaptor sleeve to engage and support the lower end of the engine drive shaft.

6. The machine of claim 5 wherein said spacer ring and spacer sleeve are of substantially the same height.

7. The machine of claim 1 wherein a vertically extending lever is pivotally mounted on said arm mechanism interjacent its ends and has its lower end connected to said flail device, there being a cable functioning as a part of said manipulatable mechanism connected to the upper end of the lever and leading inwardly which, when pulled, moves said flail device radially outwardly on said arm mechanism.

8. The machine of claim 7 wherein a coil spring is connected to the lower end of said lever, and to said arm mechanism, to normally urge the lower end of the lever radially inwardly.

9. The machine of claim 8 wherein said flail device has slide bearings which are received on said arms.

10. In a rotary lawn mowing machine supported on wheels and having a generally horizontal deck with an engine releasably mounted thereon driving a vertical drive shaft protruding below the deck to mount grass cutter blade mechanism thereon below the deck at a predetermined level to cut grass in a longitudinal path as the machine moves in a forward path of travel:
   a. a releasably mounted adaptor plate mounted on top of said deck, the plate having an opening for passing said shaft and incorporating an extension arm mechanism with parallel arms extending radially therefrom;
   b. a first pulley fixed for rotation with said shaft at the level of said arms housed by said plate;
   c. said arm mechanism supporting a vertical flail shaft assembly having a retractable second pulley, in alignment with said first pulley and mounted on a vertical flail shaft;

d. a rotary flail device having generally outwardly extending flail members fixed to said flail shaft near the lower end thereof at a level to complement the cut taken by said blade mechanism;

e. an endless belt member trained around said pulleys within and at the level of said arms; and f. manipulatable mechanism connected to move said second pulley on said arm mechanism to engage and tauten said endless member to thereby drive said flail shaft.

11. The machine of claim 10 wherein a resilient member connected to said arm mechanism normally urges said second pulley radially inwardly to a position in which said belt is slacked.

12. The machine of claim 11 wherein a vertically extending lever is pivoted for movement about a generally horizontal axis on said arm mechanism, said resilient member comprises a stretchable coil spring connected to the lower end of the lever, and a coupling connects the lower end of the lever to said flail device.

13. The machine of claim 12 wherein said machine has an upstanding handle extending from said deck, a cable connects to the upper end of the lever and leads to the handle of said machine, and an operating member connected to said handle is coupled to said cable such that motion of said operating member pulls said cable and the upper end of said lever in a radially inward direction to move said flail device and second pulley radially outwardly to tauten said belt and revolve said flail device.

14. The machine of claim 13 in which said operating member is a second pivotally mounted lever.

15. The machine of claim 11 wherein said flail device has slide bearings, received on said arms, which mount said flail device and second pulley for reciprocatory radial movement.

16. A method of converting an engine-driven, rotary lawn mowing machine supported on front and rear wheels, and having a generally horizontal deck with an engine releasably mounted thereon having a vertical drive shaft protruding through an opening in the deck to mount grass cutter blade mechanism thereon below the deck at a predetermined level to cut grass in a longitudinal path as the machine moves in a forward path of travel, to incorporate a rotary flail device having generally outwardly projecting grass trimming flails, the lawn mowing machine having an engine releasably secured to the top of said deck in a manner such that its drive shaft extends down through the deck, and there being a grass cutting blade releasably mounted on the lower end of the drive shaft comprising the steps of:

a. releasing the engine from the deck and the blade from the drive shaft;

b. disposing a horseshoe shaped adaptor plate having sidewisely forwardly radially extending spaced arms on said deck, the arms radially slideably supporting a rotary flail device having a first pulley at its upper end;

c. receiving the shaft in an adaptor sleeve, having a second pulley on its upper end above said deck within said adaptor plate, training a belt on said first pulley and extending between said arms around said second pulley, and affixing said sleeve to the shaft;

d. mounting the blade to be revolved with said shaft and adaptor sleeve; and e. reaffixing said engine to the deck with the adaptor sleeve fixed between the deck and engine.

17. The method of claim 16 wherein a spacer ring is affixed between said engine and adaptor plate, and a spacer sleeve is inserted in said adaptor sleeve to control the extent to which said shaft is received within the adaptor sleeve.

18. The method of claim 16 wherein the engine has a mounting flange with spaced openings therein, and said adaptor plate has the same spaced apart openings, and bolts are inserted through said openings in the engine flange, adaptor plate and deck to remount the engine.

19. An attachment for a motorized lawn mowing machine supported on front and rear wheels and having a generally horizontal deck with an engine releasably mounted thereon having a vertical drive shaft protruding through an opening in the deck to mount grass cutter blade mechanism thereon below the deck at a predetermined level to cut grass in a longitudinal path as the machine moves in a forward path of travel, comprising:

a. a releasably mounted adaptor plate for mounting on said deck between said engine and deck, the plate having an opening for passing said shaft and having radially extending extension arm mechanism with parallel arms projecting radially at a sidewisely forward angle;

b. a first pulley fixed for rotation with said shaft within said adaptor plate at the level of said arms;

c. said arm mechanism slideably supporting a vertical flail shaft assembly having a second pulley in alignment with said first pulley mounted on a vertical flail shaft;

d. a rotary flail device having generally outwardly extending, grass trimming, flail members fixed to said flail shaft near the lower end thereof at a level to complement the cut taken by said blade mechanism;

e. an endless belt drive member trained around said pulleys; and f. manipulatable mechanism connected to slide said vertical flail device on said arm mechanism to engage and tauten said endless member and thereby drive said flail shaft in rotation.

20. The attachment of claim 19 which includes an adaptor sleeve, for receiving and affixing to the engine shaft, which has said first pulley mounted on its upper end.

* * * * *